United States Patent
Kristof et al.

(10) Patent No.: US 10,421,364 B2
(45) Date of Patent: Sep. 24, 2019

(54) VEHICLE, IN PARTICULAR AN ELECTRIC VEHICLE OR A HYBRID VEHICLE, AND METHOD FOR CHARGING AN ENERGY STORAGE CELL OF A VEHICLE

(71) Applicant: Dr. Ing. h.c. F. Porsche Aktiengesellschaft, Stuttgart (DE)

(72) Inventors: Thomas Kristof, Karlsruhe (DE); Dirk Herke, Kirchheim unter Teck (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/806,818

(22) Filed: Nov. 8, 2017

(65) Prior Publication Data
US 2018/0134167 A1    May 17, 2018

(30) Foreign Application Priority Data
Nov. 16, 2016  (DE) .......... 10 2016 122 002

(51) Int. Cl.
  *H02J 7/00*         (2006.01)
  *B60L 11/18*        (2006.01)
  *H02M 3/07*         (2006.01)
  *B60L 53/14*        (2019.01)
  (Continued)

(52) U.S. Cl.
  CPC .......... *B60L 11/1811* (2013.01); *B60L 53/14* (2019.02); *B60L 53/20* (2019.02); *B60L 53/60* (2019.02); *H02M 3/07* (2013.01); *B60L 2210/10* (2013.01); *Y02T 10/7005* (2013.01); *Y02T 10/7072* (2013.01); *Y02T 10/7216* (2013.01); *Y02T 90/121* (2013.01); *Y02T 90/127* (2013.01); *Y02T 90/128* (2013.01); *Y02T 90/14* (2013.01); *Y02T 90/163* (2013.01)

(58) Field of Classification Search
  CPC ....................................... Y02T 90/14
  USPC ....................................... 320/109
  See application file for complete search history.

(56) References Cited

U.S. PATENT DOCUMENTS

| 5,548,200 A * | 8/1996 | Nor ........... B60L 11/184 320/106 |
| 7,550,943 B2 * | 6/2009 | Spartano ....... H02J 1/00 320/107 |
| 8,810,206 B2 | 8/2014 | Ang |

(Continued)

FOREIGN PATENT DOCUMENTS

| DE | 102011086309 A1 | 5/2013 |
| EP | 1562279 A2 | 8/2005 |

(Continued)

OTHER PUBLICATIONS

German Search Report for German Application No. 10 2016 122 002.7, dated May 22, 2017, with partial English translation—8 Pages.

(Continued)

*Primary Examiner* — Yalkew Fantu
(74) *Attorney, Agent, or Firm* — RatnerPrestia

(57) ABSTRACT

A vehicle, in particular an electric vehicle or a hybrid vehicle, having a charging apparatus for charging a vehicle-integrated energy storage cell by means of an external voltage source, wherein the charging apparatus has a charge pump for setting a voltage ratio between an input voltage and an output voltage, wherein the charge pump provides at east two discrete voltage ratios.

7 Claims, 1 Drawing Sheet

(51) Int. Cl.
    *B60L 53/20*    (2019.01)
    *B60L 53/60*    (2019.01)

(56) References Cited

U.S. PATENT DOCUMENTS

| | | | | |
|---|---|---|---|---|
| 2009/0288896 | A1* | 11/2009 | Ichikawa | B60K 6/365 |
| | | | | 180/65.265 |
| 2010/0019723 | A1* | 1/2010 | Ichikawa | B60L 11/123 |
| | | | | 320/109 |
| 2010/0231167 | A1* | 9/2010 | Ohnuki | H02J 7/0018 |
| | | | | 320/119 |
| 2012/0249065 | A1* | 10/2012 | Bissonette | B60L 11/184 |
| | | | | 320/109 |
| 2013/0106365 | A1 | 5/2013 | Ang | |
| 2013/0221921 | A1* | 8/2013 | Ang | B60L 11/1811 |
| | | | | 320/109 |
| 2014/0088781 | A1* | 3/2014 | Kearns | H02J 3/14 |
| | | | | 700/295 |

FOREIGN PATENT DOCUMENTS

| | | |
|---|---|---|
| EP | 2596979 A1 | 5/2013 |
| JP | 2005224059 A | 8/2005 |
| JP | 5348326 B2 | 11/2013 |
| WO | 2012011176 A1 | 1/2012 |

OTHER PUBLICATIONS

Notification of Reason for Rejection for Japanese Application No. 2017-217397, dated Oct. 30, 2018, 2 pages.
Notice of Preliminary Rejection for Korean Application No. 10-2017-0152005, dated Mar. 11, 2019, 4 pages.

* cited by examiner

VEHICLE, IN PARTICULAR AN ELECTRIC VEHICLE OR A HYBRID VEHICLE, AND METHOD FOR CHARGING AN ENERGY STORAGE CELL OF A VEHICLE

CROSS-REFERENCE TO RELATED APPLICATIONS

This application claims priority to German Patent Application No. 10 2016 122 002.7, filed Nov. 16, 2016, which is incorporated by reference herein in its entirety.

FIELD OF THE INVENTION

The present invention relates to a vehicle, in particular an electric vehicle or a hybrid vehicle, and a method for charging an energy storage cell of a vehicle.

BACKGROUND OF THE INVENTION

Electric vehicles or hybrid vehicles are well known from the prior art. Said vehicles are typically driven by electric machines, which in turn are supplied with power by an energy storage cell, for example a high-voltage battery. To that end, the energy storage cell has to be charged regularly and is connected to an external power supply, e.g. a charging station, for this purpose. In some cases, voltage doubling, where the voltage of the external power supply is doubled, is required in order to provide an adequate charging voltage for the energy storage cell. Said voltage doubling is performed, in particular, by a charging apparatus, which is interconnected between the energy storage cell and the external power supply during charging. Simple voltage doubling can be realized here by means of a simple charge pump, for example.

It is further known from the prior art to adjust the charging voltage during charging. A voltage adjustment of this kind is generally carried out by a DC voltage converter.

SUMMARY OF THE INVENTION

It is an object of the present invention to provide a vehicle that has a charging apparatus that is as compact and light as possible and that makes it possible to charge the energy storage cell more effectively than is the case when charging using a simple charge pump.

The object of the present invention is achieved by a vehicle, in particular an electric vehicle or a hybrid vehicle, having a charging apparatus for charging a vehicle-integrated energy storage cell by means of an external voltage source, wherein the charging apparatus comprises a charge pump for setting a voltage ratio between an input voltage and an output voltage, wherein the charge pump has at least two link circuits for setting different voltage ratios.

In comparison with the prior art, the charge pump according to aspects of the invention has at least two link circuits. In comparison with a simple charge pump, the charge pump according to aspects of the invention has the advantage that it can change between different discrete voltage ratios during charging, with the result that an at least partial adjustment of the input voltage to suit an optimized charging voltage is possible and therefore short charging times can be realized. In comparison with DC-DC voltage converters, the charge pump according to aspects of the invention has the advantage that it is less complex and can be realized easily, with the result that there are corresponding advantages with respect to weight and costs.

The external power supply is preferably a charging station, to which the energy storage cell is electrically connected. In this case, the charging apparatus is interconnected, in particular, between the energy storage cell and the charging station. The charging apparatus here is preferably integrated in the vehicle. There is further provision for the charging apparatus to be configured to change between at least two voltage ratios, between the input voltage and the output voltage, during charging. In comparison with a simple charge pump, in which voltage doubling is realized at the output by interconnecting a primary mesh and a secondary mesh, there is, in particular, provision in the charge pump according to aspects of the invention for the secondary mesh to have at least two link circuits. Depending on how the link circuits are interconnected with respect to one another, the second mesh respectively contributes to forming the voltage at the output of the charging apparatus. Switches are provided for interconnecting the circuits with one another. There is further provision for each link circuit to have a diode and a link circuit capacitor. Here, the electrical energy required for setting the respective voltage ratio is stored in the respective link circuit capacitors.

Advantageous embodiments and refinements of the invention will emerge from the subclaims and from the description with reference to the drawings.

In accordance with a further embodiment of the present invention, there is a provision for the output voltage to be applied to the energy storage cell and, when the energy storage cell is being charged, for the voltage of the external power supply to be applied to the charge pump as the input voltage.

In accordance with a further embodiment of the present invention, there is a provision for the charge pump to have two link circuits, which can be connected either in parallel or in series for setting different voltage ratios. There are preferably exactly two link circuits and the output voltage is either twice the input voltage or 1.5 times the input voltage. The two link circuits can be discharged not only in parallel or in series, but it is possible for only one to be discharged and the second to remain charged.

In accordance with a further embodiment of the present invention, there is a provision for the charging apparatus to have a control apparatus for automatically setting the voltage ratio. It is possible, for example, to use the control apparatus to change between two voltage ratios in a timely manner during charging.

In accordance with a further embodiment of the present invention, there provision for the charge pump to be configured in such a way that a plurality of fixed voltage ratios can be set. As the number of link circuits increases, it is possible here to set the number of voltage ratios that can potentially be set. The number of link circuits is preferably adapted to the application or the vehicle-specific requirement.

A further subject of the present invention is a method for charging a vehicle-integrated energy storage cell, in particular a vehicle-integrated energy storage cell in a vehicle according to aspects of the invention, wherein a charge pump having a plurality of link circuits is used to change between a plurality of fixed voltage ratios between an input voltage and an output voltage.

BRIEF DESCRIPTION OF THE DRAWING

Further details, features and advantages of the invention will emerge from the drawings and from the following description of preferred embodiments on the basis of the drawings. Here, the drawings illustrate merely exemplary embodiments of the invention, which do not restrict the essential concept of the invention.

In the different figures, identical parts are always provided with the same reference symbols and are therefore also generally designated or mentioned in each case only once.

DETAILED DESCRIPTION OF THE INVENTION

Figure 1:
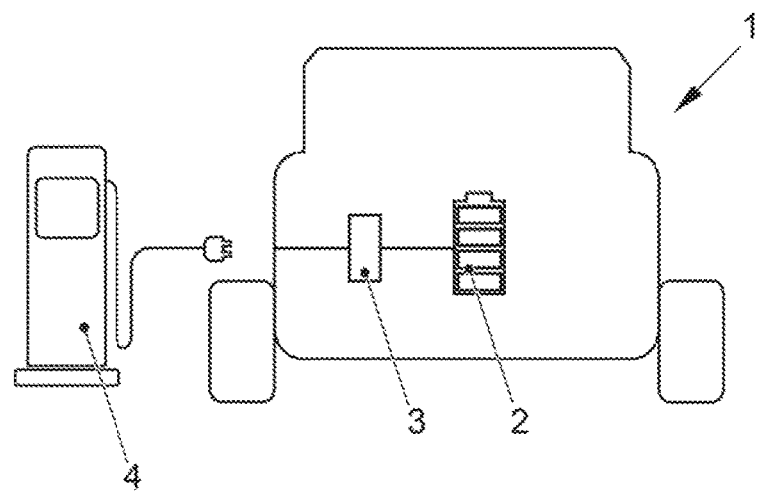
FIG. 1 shows a charging station together with a vehicle in accordance with an exemplary embodiment of the present invention.

FIG. 1 illustrates a charging station 4 together with a vehicle 1 in accordance with an exemplary embodiment of the present invention. Here, the charging station 4 serves as an external voltage source, which is used to charge an energy storage cell 2 that is integrated in the vehicle 1. Said energy storage cell is, in particular, an energy storage cell 2 that serves as the power supply for an electric machine that drives the vehicle. In order to charge energy storage cells 2 of this kind, comparatively high charge voltages, for example 800 V, are required. The energy storage cell 2 is connected to the charging station 4 in order to be charged. For this purpose, the vehicle 1 has an interface, for example, by means of which the energy storage cell 2 is connected to the charging station 4. For the best possible charging process, a charging apparatus 3 is interconnected between the vehicle-integrated energy storage cell 2 and the charging station 4. This ensures that the voltage provided by the charging station 4 is converted to a suitable charging voltage. In this case, the voltage provided by the charging station is applied to the charging apparatus 3 as the input voltage 8 and the charging apparatus provides the optimized charging voltage to the energy storage cell 2 as the output voltage 9. If it is desirable to continuously set the voltage ratio between input voltage 8 and output voltage 9, which in turn allows the charging voltage to be optimally adjusted during charging, a DC-DC voltage converter or DC-DC converter is required, which is comparatively heavy, fills installation space and is costly to purchase. However, a simple charge pump, in which the voltage provided by the charging station is merely duplicated, in particular doubled, cannot adjust the charging voltage during charging.

Therefore, in accordance with the invention, a charge pump having at least two link circuits 5 is provided, said link circuits being connected either in parallel or in series, with the result that it is possible to change between different discrete or fixed voltage ratios during charging. As a result, it is advantageously possible to utilize a comparatively simple circuit to provide a charging voltage that changes over time during charging, without having to resort to the comparatively heavy DC-DC voltage converter that fills installation space. Here, there is provision, in particular, for the number of voltage ratios that can potentially be set to increase as the number of link circuits 5 increases. In this case, it is particularly conceivable for the number of link circuits 5 to be adapted to the respective application, with the result that, depending on requirements, a balanced ratio can be realized from the number of link circuits 5 and the complexity of the circuit as a whole.

Figure 2:
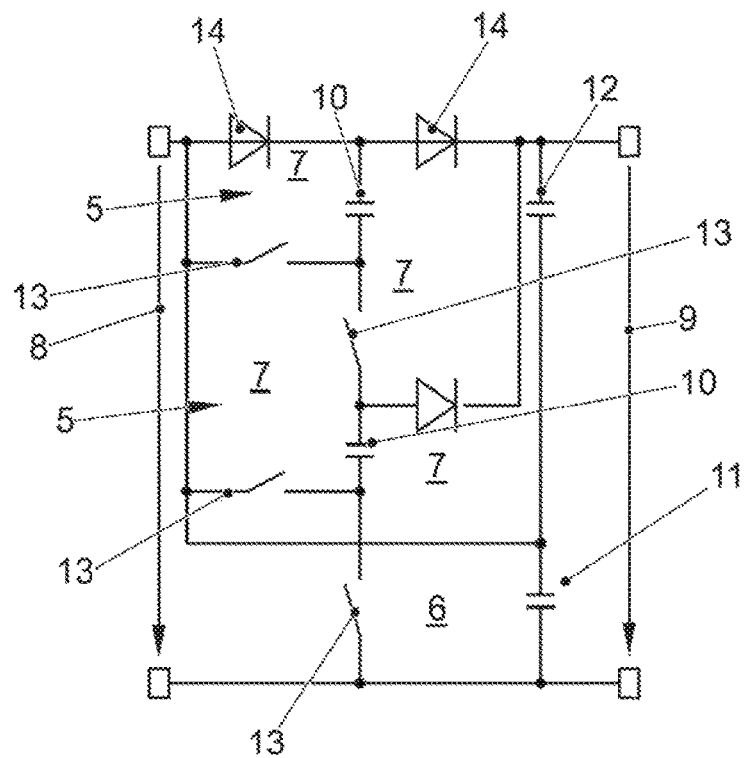
FIG. 2 shows a charge pump for a vehicle from FIG. 1.

FIG. 2 illustrates an example of a circuit diagram for a charge pump having two link circuits 5 for a vehicle 1 from FIG. 1. Here, there is provision for the output voltage 9 to be tapped across a primary capacitor 11 and a secondary capacitor 12. In this case, the primary capacitor 11 is part of a primary mesh 6 and the secondary capacitor is part of a secondary mesh 7. The secondary mesh 7 in turn comprises the two link circuits 5, which each have a diode 14 and a link circuit capacitor 10. An appropriate voltage will be dropped across the secondary capacitor 12 depending on whether said two link circuits 5 are connected in parallel or in series with one another. Switches 13 that can either be closed or opened are provided for interconnecting the link circuits 5 and hence for changing the voltage ratio during charging. In other words: the voltage drop across the secondary capacitor 12 can be determined by means of the connection of the link circuits 5 in relation to one another, as a result of which a voltage drop that determines the overall voltage can be set by means of the primary capacitor 11 and the secondary capacitor 12. As a result of this, the voltage ratio between the input voltage 8 and the output voltage 9 can be changed. In particular, the input voltage 8 can be doubled when the link circuits 5 are connected in series, and an output voltage 9 that corresponds to 1.5 times the input voltage 8 can be provided when the link circuits 5 are connected in parallel. Furthermore, there is provision for the switches 13 that are provided in the circuit to be switched at least partially periodically in order to charge the link circuit capacitors 10.

What is claimed is:
1. A vehicle comprising:
a vehicle-integrated energy storage cell; and
a charging apparatus comprising a charge pump for setting a voltage ratio between an input voltage from an external voltage source and an output voltage to the vehicle-integrated energy storage cell, wherein the charge pump includes:
a plurality of switches,
at least two link circuits interconnected with the switches to be selectively connectable between parallel and series by closed and open interconnection with the switches for setting different voltage ratios between the input voltage from the external voltage source and the output voltage to the vehicle-integrated energy storage cell, each link circuit including a respective diode and a respective link circuit capacitor,
a first mesh comprising a primary capacitor, and
a second mesh comprising a secondary capacitor and the at least two link circuits;
wherein the output voltage is tapped across the primary capacitor and the secondary capacitor.

2. The vehicle as claimed in claim 1, wherein the output voltage is applied to the energy storage cell and, when the energy storage cell is being charged, the voltage of the external power supply is applied to the charge pump as the input voltage.

3. The vehicle as claimed in claim 1, wherein the charging apparatus further comprises a control apparatus for automatically setting the voltage ratios.

4. The vehicle as claimed in claim 1, wherein the charge pump is configured to set a plurality of discrete voltage ratios.

5. The vehicle as claimed in claim 1, wherein the vehicle-integrated energy storage cell is configured to supply power to an electric machine.

6. A method for charging a vehicle-integrated energy storage cell, as claimed in claim 1, wherein the charge pump having the at least two link circuits is used to change between a plurality of discrete voltage ratios, between the input voltage and the output voltage.

7. The method of claim 6, wherein the vehicle-integrated energy storage cell is in a vehicle.

\* \* \* \* \*